United States Patent [19]

Hatcher

[11] Patent Number: 5,046,135
[45] Date of Patent: Sep. 3, 1991

[54] METHOD AND APPARATUS FOR FREQUENCY STABILIZATION OF A DOWN CONVERTER

[75] Inventor: G. Stephen Hatcher, Kent, Wash.

[73] Assignee: John E. Chance & Associates, Lafayette, La.

[21] Appl. No.: 443,145

[22] Filed: Nov. 30, 1989

[51] Int. Cl.$^5$ .............................................. H04B 1/26
[52] U.S. Cl. ................... 455/303; 455/316; 455/317; 342/358; 364/421
[58] Field of Search ............... 455/214, 302, 303, 314, 455/315, 317, 319, 316; 342/357, 358, 395, 400, 420; 364/427

[56] References Cited

U.S. PATENT DOCUMENTS 3,124,799  6/1964  Hagedorn et al. ............... 342/358
4,408,352 10/1983  Dudding ........................... 455/317
4,918,748  4/1990  Shahriary et al. ................ 455/317
4,928,315  5/1990  Jensen et al. ..................... 455/303

Primary Examiner—Reinhard J. Eisenzopf
Assistant Examiner—Lisa D. Charouel
Attorney, Agent, or Firm—Dodge, Bush & Moseley

[57] ABSTRACT

A method and apparatus is disclosed for automatic elimination of frequency instabilities in a receiver frequency converter. Such instabilities result from temperature variations and mechanical vibrations of the local oscillator of a first stage converter. A marker signal is introduced into the first stage down converter mixer and is subjected to the same variations in frequency conversion as is the received signal from an antenna. Intermediate down converted received signals and an intermediate down converted marker signal are received by a second stage converter where such signals are applied to a mixer, the output of which is free of frequency variations introduced by the local oscillator of the first stage converter.

12 Claims, 2 Drawing Sheets

FIG.1
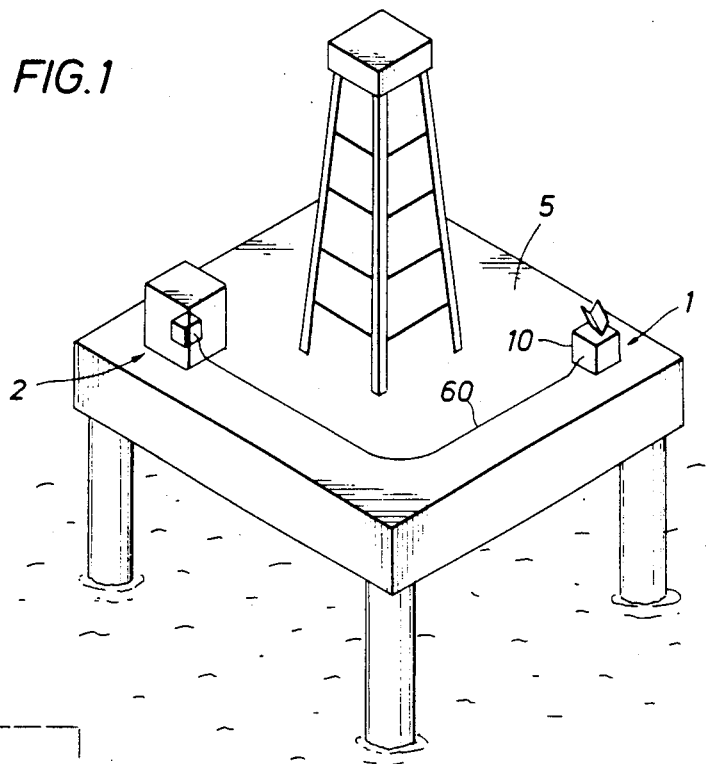
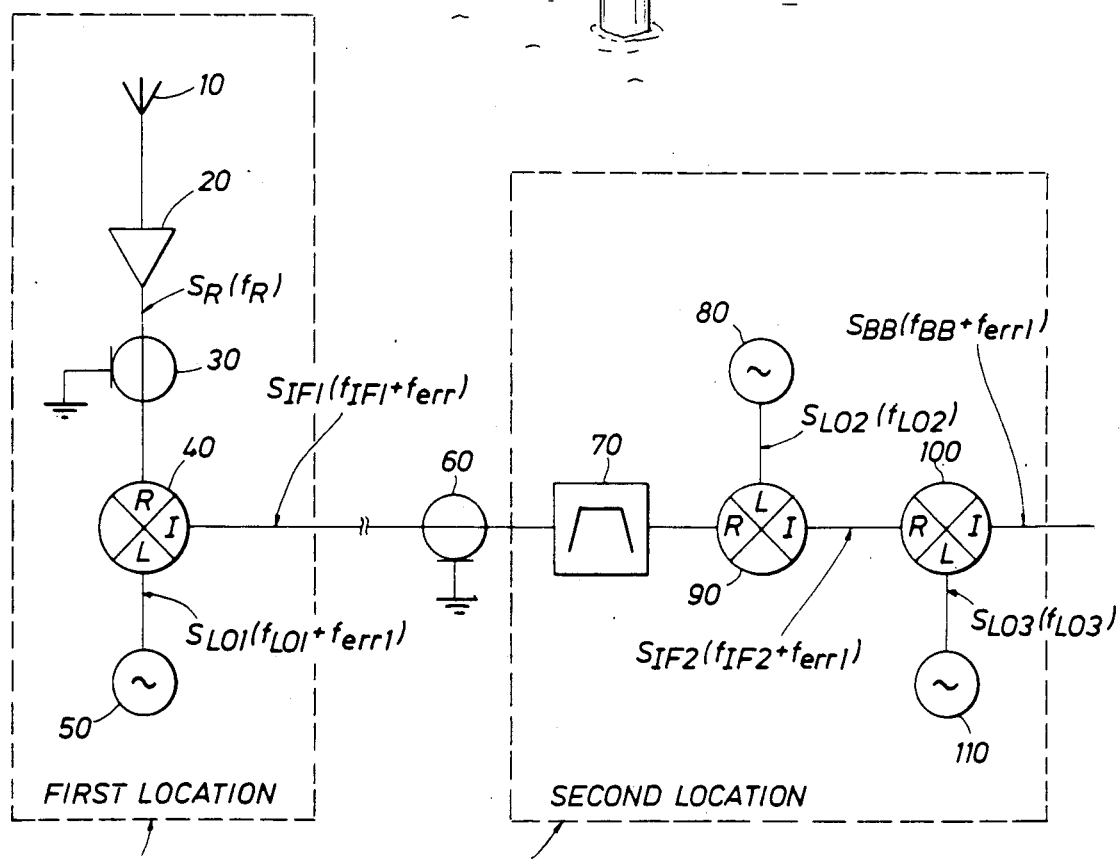
FIG.2 (PRIOR ART)

METHOD AND APPARATUS FOR FREQUENCY STABILIZATION OF A DOWN CONVERTER

BACKGROUND OF THE INVENTION

1. Field of the Invention

This invention relates to the field of frequency down conversion, which is also referred to by such names as frequency translation, heterodyne action, mixing and beating. Specifically the invention relates to frequency conversion systems which have frequency errors introduced into the frequency converted signal because of environmental effects.

2. Description of the Prior Art

In a superheterodyne receiver, a received signal is converted to a lower frequency to facilitate the data demodulation and other signal measurement functions. This process of converting the signal to a lower frequency may incorporate multiple stages that convert the signal to successively lower frequencies, or in some cases a combination of conversions to higher and lower frequencies are used to ultimately bring the signal frequency down to the desired lower frequency. This process of frequency conversion can introduce significant phase and frequency errors into the signal.

Superheterodyne receivers have been used in space-based positioning systems where high frequency signals from satellites are detected, for example, on offshore drilling platforms, seismic boats and the like, where onboard computers provide immediate positioning data. Usually, one or more antennae are located on such platforms and boats in an open area so as to obtain, as much as possible, a clear view of the sky with an antenna. The signal detected at the antenna site on the platform or boat must be transmitted via a coaxial cable to a receiver so that it may be down converted in frequency, and ultimately demodulated.

Because the attenuation at the extremely high received carrier frequency, e.g., about 4 GHz, is excessive when such a high frequency signal is transmitted via coaxial cable, the received signal at the antenna site is down converted to a lower frequency so as to decrease signal attenuation for transmission via the cable to further down-conversion circuitry. Unfortunately, inexpensive local oscillators useful for modulating the received signal must be placed at a location which is subject to wide variations in temperature (e.g., from −20 to +70 degrees centigrade) and mechanical vibrations. Resonators useful as local oscillators for this application may drift up to plus or minus 3 MHz for such temperature variations. Mechanical vibration creates increased resonator phase noise and generates spurious output frequencies harmonically related to the frequencies of mechanical vibration. Offshore drilling platforms and seismic surveying boats are subject to considerable vibration from engine and ocean forces.

IDENTIFICATION OF OBJECTS OF THE INVENTION

Accordingly, it is an object of this invention to provide a method and apparatus to automatically remove frequency and phase errors from the base band signal where such errors are introduced via the local oscillator of a first stage down-converter located in proximity with the antenna.

It is another object of the invention to provide a process by which the above described errors may be automatically removed from the received signal at a later down conversion stage, thereby allowing base band demodulation and other signal measurement functions to be performed uncorrupted by the down conversion process itself.

SUMMARY OF THE INVENTION

In accordance with the objects identified above as well as achieving other features and advantages, a method and apparatus are provided to receive an information signal superimposed on a high frequency carrier signal. The information signal includes a band of frequencies carrying information content. The received signal is detected form an antenna disposed at a location subject to temperature variations and mechanical vibration. A first down converter stage is disposed near the antenna location so as to reduce the carrier frequency on which the band of frequencies is riding. Such reduction in frequency is necessary so as to minimize, as much as possible, attenuation of the signal as it is transmitted via a coaxial cable to other stages of the down-conversion apparatus. Such other stages are disposed at another or second location which is not subject to extreme temperature variations and mechanical vibrations.

Unfortunately, low cost local oscillators suitable for use with such first down converter stage are subject to frequency and phase variations when subjected to such temperature variations and mechanical vibrations. As a result, the intermediate frequency down conversion of the received signal is corrupted by such frequency and phase variations. Such corruption continues even after subsequent down conversion stages at the second location.

The invention specifies that a marker signal of a marker frequency be generated at the second location where its local oscillator may be protected from environmental effects. Such marker signal is applied via the coaxial cable which connects the first down conversion stage and subsequent down conversion stages. After multiplication of the marker frequency and application of the multiplied marker frequency marker signal to a mixer with the first stage local oscillator signal, an intermediate frequency marker signal is produced on the cable which is contaminated with the same frequency or phase error as is the intermediate frequency information signal. Care is taken to insure that the marker intermediate signal does not interfere or overlap with the received band of information signals which have been down converted to an intermediate frequency.

At the second location, the intermediate frequency information signal and the intermediate frequency marker signal are separated onto second and third processing paths by means of appropriate high-pass and low-pass filters. After up or down conversion of each signal on such second and third processing paths as appropriate, the intermediate frequency information signal is applied to a mixer to which also is applied the intermediate frequency marker signal. The modulation process of the mixer causes the frequency error from the two signals to completely cancel each other, resulting in a base band information signal free of frequency error introduced at the first down conversion stage of the system.

BRIEF DESCRIPTION OF THE DRAWINGS

The objects, advantages and features of the invention will become more apparent by reference to the drawings which are appended hereto and wherein like numerals indicate like parts wherein an illustrative embodiment of the invention is shown, of which:

FIG. 1 is an illustration of the environment in which the receiver system invention is usually placed; that is, aboard an offshore drilling platform or the like, where an antenna receives a satellite transmitted information band of signals on a high frequency carrier signal;

FIG. 2 is an illustration of a prior art down conversion process wherein frequency errors are introduced into the down converted received signal because of temperature variation and mechanical vibration effects on the local oscillator of the first down conversion stage.

DESCRIPTION OF THE INVENTION

Figure 3:
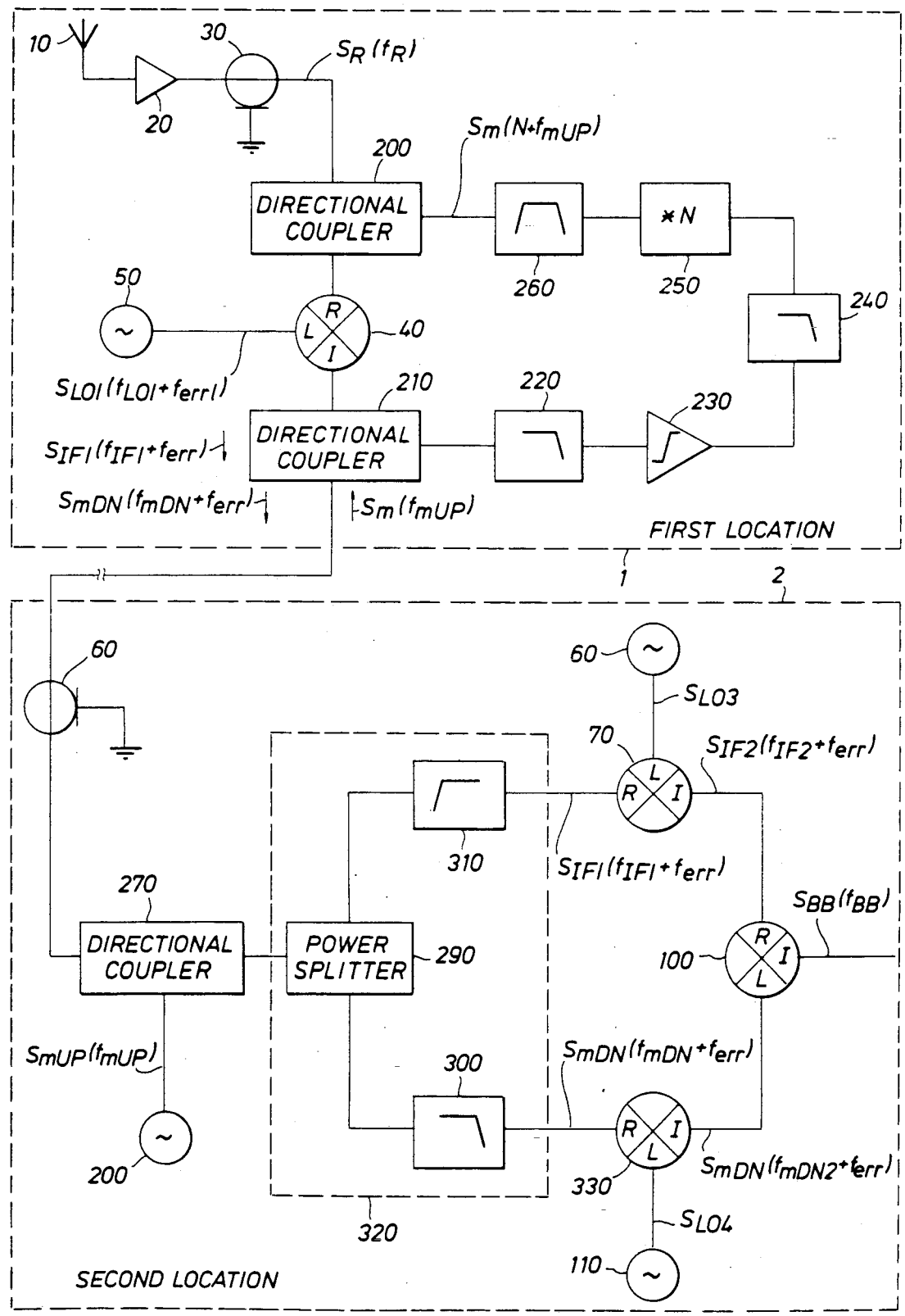
FIG. 3 is an illustration of the apparatus and method of the invention by which a signal having a marker frequency is transmitted up to the first down conversion stage and after multiplication and down conversion, such marker frequency signal is subsequently used as the local oscillator to modulate the down-converted information signal to eliminate frequency and phase errors introduced at the first down-conversion stage.

FIG. 1 illustrates a receiver system aboard an offshore drilling platform 5 or the like. Such receiver system advantageously may be part of a satellite based position fixing system whereby position data is transmitted via satellites to one or more antennae 1 located on the platform. An antenna must be placed on the platform in a position to obtain a relatively unobstructed view of the sky. Such position may be up to 400 feet from a location where electronic equipment may be protected from temperature variations and mechanical vibration.

In order to reduce attenuation of the received signal at the antenna 10 at location 1 via a cable 60 to subsequent down conversion stages at location 2, a first down conversion stage at location 1 is provided to down convert or translate the received carrier signal to an intermediate frequency. FIG. 2 schematically shows the elements of the complete prior art down conversion system. Filters and amplifiers necessary in an actual receiver down converter are omitted from the drawings unless pertinent to the description of the invention, because their specification would represent information which is elementary to one skilled in the receiver art.

In FIG. 2, a prior art down conversion process is illustrated for a superheterodyne receiver without the marker frequency injection of the invention which will be illustrated below in FIG. 3. An information signal $S_R$ at received frequency $f_R$ is produced on antenna 10 and is amplified by low-noise amplifier 20. Received frequency $f_R$ is in reality a band of information frequencies superimposed on a carrier frequency in the giga hertz ($10^9$ cps) range. The amplified signal $S_R$ is conducted along an optional cable assembly 30 to a first stage down converter receiver mixer 40. The first frequency conversion occurs at mixer 40 where a local oscillator 50 creates a signal $S_{LO1}$ of frequency $f_{LO1}$ which is mixed with the received signal $S_R$ of frequency $f_R$ and filtered to create an intermediate signal $S_{IF1}$ of frequency $f_{IF1}$ where $$f_{IF1} = \text{absolute value } (f_R - f_{LO1}). \quad (1)$$

The signal $S_{IF1}$ is conducted along an optional cable 60, applied to bandpass filter 70 and down converted at mixer 90 by mixing the local oscillator 80 signal $S_{LO2}$ of frequency $f_{LO2}$ with signal $S_{IF1}$ of frequency $f_{IF1}$ to create a second intermediate frequency signal $S_{IF2}$ of frequency $f_{IF2}$ where $$f_{IF2} = \text{absolute value } (f_{IF1} - f_{LO2}). \quad (2)$$

The above process is a two stage down conversion. More than two stages are used as required depending on the application. (The process and apparatus described above uses low-side frequency conversion in the mixers although high-side frequency conversion could be alternatively used). A three stage down conversion is depicted in FIG. 1 where $f_{IF2}$ is mixed with a signal $S_{LO3}$ of frequency $f_{LO3}$ from local oscillator 110 at mixer 100 to create baseband frequency signal $S_{BB}$ of frequency $f_{BB}$ wherein, $$f_{BB} = \text{absolute value } (f_{IF2} - f_{LO3}). \quad (3)$$

It is assumed that $f_{BB}$ is the low frequency required for demodulation of the information carried on the base band carrier $f_{BB}$.

If the local oscillator 50 produces a local oscillator signal $S_{LO1}$ of frequency $f_{LO1}$ which contains an error source $f_{ERR1}$ due to oscillator drift from temperature or age or due to mechanical vibration, this error will be present in the frequency of $S_{IF1}$, or $$f_{IF1} = \text{absolute value } (f_R - f_{LO1} + f_{ERR1}) \quad (4)$$

which propagates to the second intermediate stage signal $S_{IF2}$ of a frequency $f_{IF2}$ where $$\begin{aligned} f_{IF2} &= \text{absolute value } (f_{IF1} - f_{LO2}) \\ &= \text{absolute valve } (f_R - f_{LO1} - f_{LO2} + f_{ERR1}) \end{aligned} \quad (5)$$

and finally to baseband frequency $f_{BB}$ where $$\begin{aligned} f_{BB} &= \text{absolute value } (f_{IF2} - f_{LO3}) \\ &= \text{absolute valve } (f_R - f_{LO1} - f_{LO2} - f_{LO3} + f_{ERR1}) \end{aligned} \quad (6)$$

Similarly, an error in frequencies from oscillators 80 or 110, that is in $f_{LO2}$ and/or $f_{LO3}$, would result in further error terms such that the baseband signal would be $$\begin{aligned} f_{BB} = &\text{absolute value} \\ &(f_R - f_{LO1} - f_{LO2} - f_{LO3} + f_{ERR1} + f_{EER2} \\ &+ ERR3). \end{aligned} \quad (7)$$

However, the first down conversion is often at a first location 1 away from the main receiver assembly at a second location 2 so that a lower frequency ($f_{IF1}$) may be used to transmit the information signals down the cable. A lower frequency signal has lower attenuation losses in the cable as compared to the received signal $f_R$. The remote down converter at first location 1 also typically has the highest local oscillator frequency and simultaneously suffers the greatest environmental stress. This stress is thermal and mechanical in original and tends to induce frequency drift and/or spurious frequency generation in the down converter.

In FIG. 3 the down conversion process and apparatus of the invention is illustrated for a superheterodyne receiver with marker frequency injection. The received signal path is identical to that described for the prior art using FIG. 1. The marker frequency is first generated.

A local oscillator 200 in the receiver at location 2 creates a signal $S_{MUP}$ of frequency $f_{MUP}$ which is outside the first stage intermediate frequency bandwidth so as to not interfere with downstream reception. Typically the frequency is below the receiver band so that it is minimally attenuated when conducted along cable 60. The marker signal $S_{MUP}$ is coupled onto the cable 60 via directional coupler 270. Coupler 270 directs signal $S_{MUP}$ via cable 60 but does not allow such signal to pass to diplexer 320.

The marker signal $S_{MUP}$ is coupled off of cable 60 by directional coupler 210 and filtered by filter 220 so that the frequency $f_{MUP}$ is the predominant signal entering amplifier/limiter 230. The limiter serves to stabilize the amplitude of signal $S_{MUP}$ which will vary with the length of cable 60 and frequency of $f_{MUP}$. If cable 60 is a fixed length and frequency $f_{MUP}$ is a fixed frequency, then a limiter is not required to fix the amplitude of $S_{MUP}$. Lowpass filter 240 suppresses any harmonics generated by the limiting process.

The signal $S_{MUP}$ next has its frequency converted using a combination of frequency doubler and/or quadrupler to create a frequency, $N*f_{MUP}$, where N is the frequency multiplication factor from combining doublers and quadruplers. An alternative approach generates odd harmonics using a comb generator or other nonlinear device. An optional bandpass filter 260 is provided to suppress spurious frequency products resulting from the frequency multiplication process before they enter cable 30. This prevents such spurious products from interfering in the normal receiver operation. The marker signal $S_M(N*f_{MUP})$ is coupled into cable 30 by directional coupler 200.

The frequency $N*f_{MUP}$ is outside of the band of normally received signals, being provided at either above or below such frequencies. The marker signal $S_M(N*f_{MUP})$ signal is down converted by mixer 40 by modulating it with the local oscillator 50 signal $S_{LO1}$. The down converted signal, $S_{MDN}$, is characterized by a frequency $f_{MDN}$ where $$f_{MDN} = \text{absolute value}(f_{LO1} - N*f_{MUP} + f_{ERR1}) \quad (8)$$

where $f_{ERR1}$ is the error frequency of local oscillator 50 previously defined. The down converted marker signal $S_{MDN}$ of frequency $f_{MDN}$ is conducted along cable 60 and enters a diplexer 320 which splits the normal first stage IF received signals and $f_{MDN}$ apart into separate processing paths via power splitter 290. The diplexer 320 includes a highpass filter 310 and lowpass filter 300 where $f_{MDN} < f_{IF1}$ and vice versa where $f_{MDN} > f_{IF1}$.

The signal $S_{MDN}$ is down converted again at mixer 330 by mixing it with a local oscillator signal $S_{LO4}$ from local oscillator 110. The resulting signal $S_{MDN2}$ of frequency $f_{MDN2}$ is produced where $$f_{MDN2} = \text{absolute value}(f_{MDN2} + f_{ERR1} - f_{LO4}) \quad (9)$$

The intermediate stage signal $S_{IF1}$ may be down converted by a second stage mixer 70 which includes a local oscillator signal $S_{LO3}$ from local oscillator 60. A second stage down converted signal $S_{IF2}$ is produced of frequency $$f_{IF2} = \text{absolute value}(f_{IF1} + f_{ERR1} - f_{LO3}) \quad (10)$$

In the final down conversion mixing process at mixer 100, the signal $S_{MDN2}$ serves as the local oscillator port signal and the signal $S_{IF2}$ is applied to the RF port of mixer 100. The resulting output from the IF port of mixer 100 is a signal having a frequency equal to the difference between $f_{MDN2}$ and $f_{IF2}$. Because both signals $S_R$ and $S_M$ pass through mixer 40 are were corrupted simultaneously by the frequency variation $f_{ERR1}$ of local oscillator 50, both suffer identical degradation. Accordingly, the base band signal $S_{BB}$ is characterized by a base band frequency $f_{BB}$, where $$\begin{aligned} f_{BB} &= \text{absolute value} \quad (f_{MND2} - f_{IF2}) \quad (11)\\ &= \text{absolute value} \quad (N*f_{MUP} - f_{LO1} + f_{ERR1} - f_{LO4}) - \\ &\quad (f_R - f_{LO1} - f_{LO2} + f_{ERR1}))\\ &= \text{absolute value} \quad (N*F_M - f_S + f_{LO2} - f_{LO4}) \end{aligned}$$

As long as the error processes of local oscillators 110 and 60, which produce frequencies $f_{LO2}$ and $f_{LO4}$, are acceptable to the required system performance, no frequency error will be produced by such oscillators. The baseband signal $f_{BB}$ is free of all error sources due to the local oscillator 50.

The marker frequency injection process invention described above has been experimentally applied to the correction of dielectric resonator oscillator instabilities in the satellite based navigation system STARFIX. STARFIX is a satellite band positioning system of John E. Chance & Associates, Inc. of Lafayette, La. Consumer grade block down converters were used to convert C-Band (3.7-4.2 GHz) satellite signals to 950-1450 MHz. Such converters typically use a dielectric-puck type oscillator or resonator to generate a local oscillator frequency of 5150 MHz. This resonator is very sensitive to temperature variations resulting in up to plus or minus 3 MHz frequency drift over the temperature range of −20 to +70 degrees centigrade. In addition this resonator is affected by mechanical vibration which increases the resonator phase noise and also generates spurious output frequencies harmonically related to the frequencies of mechanical vibration. The STARFIX receiver locates this first stage down converter atop offshore oil drilling platforms and seismic surveying boats which are subject to considerable vibration from engine and ocean forces.

In the STARFIX receiver the marker up frequency $f_{MUP}$ is 528.5 MHz and the marker up signal $S_{MUP}$ is conducted up a cable 0 to 400 feet in length to the antenna assembly which includes the first down converter. At this antenna assembly the 528.5 MHz signal is coupled off of the cable, amplified and limited, then quadrupled in frequency. The quadrupled frequency is filtered to remove spurious frequency products, then further amplified and frequency doubled to create a marker signal $S_M$ of a frequency of 4228 MHz. This signal is then coupled into the cable connecting the frontend low noise amplifier to the down converter. The down converter mixes this 4228 MHz signal with the local oscillator signal of 5150 MHz creating the marker down signal $S_{MDN}$ of frequency $f_{MDN}$ of 922 MHz. This frequency is sufficiently low to avoid interference with the received signals in the 950-1450 MHz band.

The 922 MHz signal is separated from the received signals in a diplexer, and further down converted to become the local oscillator signal for the last down conversion of the received signals. The resulting baseband signal is free from all error sources due to the first down conversion local oscillator. These error sources can be monitored on the 922 MHz $f_{MDN}$ signal which drifts in frequency and varies in phase noise and spurious levels in response to mechanical stresses.

Various modifications and alterations in the disclosed method and apparatus will be apparent to those skilled in the art from the foregoing description which does not depart from the spirit of the invention. For this reason, such changes are desired to be included in the scope of the appended claims. The appended claims recite the only limitations of the present invention. The descriptive manner which is employed for setting forth the embodiments described above should be interpreted as illustrative and not limitative.

What is claimed is:

1. A receiver for converting a high frequency received signal including a band of signal frequencies to a lower band of signal frequencies comprising:
    a first local oscillator which produces a first oscillator signal of a first oscillator frequency, said first oscillator frequency varying in frequency by an error frequency;
    means for generating a marker signal having a marker frequency;
    mixer means which is:
    (a) responsive to said received signal and said first oscillator signal for generating a first intermediate band of signal frequencies superimposed thereon, and
    (b) responsive to said marker signal and said first oscillator signal for generating a first intermediate marker signal of a first intermediate marker frequency;
    base band mixer means responsive to a signal including said first intermediate signal band and to a signal including said first intermediate marker signal for intermediate marker signal for generating a base band signal, said base band signal having a frequency band definition which includes the difference between said frequency band of said received signal and said marker frequency of said marker signal, wherein said base band signal is substantially free of said error frequency of said first oscillator frequency, and
    wherein said first intermediate band of signal frequencies and said first intermediate marker signal are generated on a single cable,
    said receiver further comprising,
    diplexer means for separating said signals on said single cable such that said first intermediate signal band is applied to a first signal path and said first intermediate marker signal is applied to a second signal path,
    a second local oscillator which produces a second oscillator signal of a second oscillator frequency,
    second mixer means which is responsive to said first intermediate signal band on said first signal path and to said second oscillator signal for generating a second intermediate signal band of frequencies superimposed thereon,
    a third local oscillator which produces a third oscillator signal of a third oscillator frequency,
    third mixer means which is responsive to said intermediate marker signal and to said third oscillator signal for generating a second intermediate marker signal of a second intermediate marker frequency, and
    wherein said second intermediate signal band and said second intermediate marker signal are applied to said base band mixer means for generating said base band signal having a frequency definition which includes the difference between said frequency of said frequency band of said received signal and said marker frequency of said marker signal and in addition said base band signal frequency definition includes the difference between said frequency of said second oscillator signal and said frequency of said third oscillator signal.

2. The receiver of claim 1 wherein said high frequency received signal is generated on an antenna which is located at a remote distance from said diplexer means,
    said high frequency received signal is in the 3.7–4.2 GHz band, and
    said first local oscillator generates a first oscillator frequency of 5150 MHz and is disposed at a location subjecting its frequency output to frequency drift due to temperature variations and/or mechanical vibration.

3. The receiver of claim 2 wherein said first intermediate band of signal frequencies is from 950 to 1450 MHz.

4. The receiver of claim 3 wherein said marker frequency of said marker signal is 4228 MHz which when mixed with said first oscillator frequency produces a first intermediate marker frequency of 922 MHz.

5. The receiver of claim 1 wherein said diplexer means responsive to signals on said single cable includes
    a high pass filter for passing to said first signal path said intermediate band of signal frequencies while blocking said first intermediate marker frequency, and
    a low pass filter for blocking said intermediate band of signal frequencies while passing said first intermediate marker frequency to said second signal path.

6. The receiver of claim 5 wherein said first intermediate marker frequency is less than frequencies of said first intermediate band of signal frequencies.

7. The receiver of claim 1 wherein
    said high frequency received signal is generated on an antenna which is located at a remote distance from a location at which said diplexer means is disposed,
    said first local oscillator and said mixer means being disposed at a location subjecting the frequency of said first local oscillator to frequency drift due to temperature and/or mechanical vibrations, said location of said first local oscillator and said mixer means being relatively nearer said antenna than said diplexer means so as to produce a band of signals in an intermediate frequency range in order to reduce attenuation of signals via said single cable to said diplexer means,
    said means for generating a marker signal including,
    a marker oscillator disposed at a location at which said diplexer means is disposed,
    said marker oscillator generating a local oscillator signal of an intermediate frequency, and
    means for transmitting said local oscillator signal and multiplying the frequency of said local oscillator signal at said local oscillator signal at said location of said first local oscillator and said mixer means to produce said marker signal of said marker frequency and applying same to said mixer means.

8. The receiver of claim 7 wherein
    said marker oscillator generates a local oscillator signal at an intermediate frequency of 528.5 MHz.

9. The receiver of claim 7 wherein said means for transmitting and multiplying the frequency of said local oscillator signal comprises, a first directional coupler means disposed at a location at which said diplexer means is disposed and associated with said single cable for accepting said local oscillator signal and directing same toward said mixer means via said single cable yet blocking transmission of said local oscillator signal via said single cable toward said diplexer means, a second directional coupler means disposed at a location at which said mixer means is disposed and associated with said single cable for accepting said local oscillator signal and directing same toward a marker multiplier loop means yet blocking transmission of said local oscillator signal via said single cable toward said mixer means, said marker multiplier loop means responsive to said local oscillator signal via said single cable for multiplying the frequency of said local oscillator signal to produce said marker signal, and a third directional coupler means disposed at a location at where said mixer means is disposed and associated with a receiving cable by which said high frequency received signal is applied to said mixer means for accepting said marker signal and directing same toward said mixer means via said receiving cable yet blocking transmission of said marker signal via said receiving cable away from said mixer means.

10. In a receiver system in which an antenna and a first frequency conversion stage is disposed at a first location subject to variations in temperature and mechanical vibration and in which a second frequency conversion stage is disposed at a second location not substantially subject to variations in temperature and mechanical vibration, wherein said first and second frequency conversion stages are interconnected by a cable, a method for substantially eliminating frequency shift errors introduced into the receiver system due to temperature variations and mechanical vibrations at said first frequency conversion stage comprising the steps of, introducing a marker signal of marker frequency into a mixer of said first frequency conversion stage so that said marker frequency is converted to an intermediate marker signal of an intermediate marker frequency by the same frequency of a first stage local oscillator as is the band of frequencies of a received signal from said antenna is converted to an intermediate received signal of intermediate band of signal frequencies, receiving said intermediate marker signal and said intermediate received signal at said second frequency conversion stage via said cable, separating said intermediate received signal and said intermediate marker signal onto respective first and second processing paths, applying said intermediate received signal and said intermediate marker signal to a mixer to produce a base band signal having a frequency band definition which includes the difference between said frequency band of said received signal and said marker frequency of said marker signal, wherein said base band signal is substantially free of said error frequency of said first stage local oscillator frequency.

11. In a receiver system in which an antenna and a local oscillator and mixer of a first frequency conversion stage is disposed at a first location which is subject to variations in temperature and mechanical vibration and in which a second frequency conversion stage is disposed at a second location, with said first and second frequency stages interconnected by a cable, apparatus for substantially eliminating frequency shift errors introduced into the receiver system due to temperature variations and mechanical vibrations effects of said local oscillator of the first frequency conversion stage comprising, means for converting a high frequency information signal received from said antenna to an intermediate frequency information signal by mixing said high frequency information signal with a signal of said local oscillator of said first conversion stage and applying said intermediate frequency information signal to said cable, said signal of said local oscillator having a nominal frequency which varies by an error frequency;

means for applying a marker signal to said first frequency conversion stage at said first location where said marker signal is modulated in said mixer by said frequency of said local oscillator and applying to said cable at said first location a first intermediate marker signal of a first intermediate marker frequency, where said local oscillator frequency is said nominal frequency which varies in frequency by said error frequency, and base band mixer circuit means connected to said cable at said second location which is responsive to said first intermediate marker signal and to said first intermediate information signal for generating a base band information signal which is substantially free of said error frequency of said local oscillator at said first location.

12. The apparatus of claim 11 wherein said base band mixer circuit means includes, means for separating said first intermediate information signal and said first intermediate marker signal onto respective first and second processing paths, and means for applying said first intermediate information signal and said intermediate information marker signal to a mixer to produce said base band information signal having a frequency band definition which includes the difference between said frequency band of said information signal and said marker frequency.

* * * * *